V. ST. C. BLACKETT.
PHOTOGRAPH FILM SEALER.
APPLICATION FILED MAY 26, 1920.

1,372,593.

Patented Mar. 22, 1921.

WITNESSES

INVENTOR
V. St Clair Blackett
BY
ATTORNEYS

UNITED STATES PATENT OFFICE.

VICTOR ST. CLAIR BLACKETT, OF HALIFAX, NOVA SCOTIA, CANADA.

PHOTOGRAPH-FILM SEALER.

1,372,593. Specification of Letters Patent. Patented Mar. 22, 1921.

Application filed May 26, 1920. Serial No. 384,424.

*To all whom it may concern:*

Be it known that I, VICTOR ST. CLAIR BLACKETT, a subject of the King of Great Britain, and a resident of Halifax, Province of Nova Scotia, and Dominion of Canada, have invented a new and Improved Photograph-Film Sealer, of which the following is a full, clear, and exact description.

This invention relates to a film holder or seal and has for an object to provide an improved construction which will seal the exposed film before removing the back of the camera containing the film.

Another object of the invention is to provide an improved sealing strip and connecting members arranged at the end of the film and so positioned as to seal the ends of the film against the wrapped part of the film after the same has been exposed before the camera is opened.

A still further object more specifically is the provision of an adhesive strip connected to the end of the film and arranged to overlap part of the body of the film when in a rolled condition, together with a tearing member adapted to be connected with the camera so as to cause the adhesive member to move to an opposite position when the film has been completely rolled after exposure.

In the accompanying drawing—

Referring to the accompanying drawing by numerals, 1 and 2 indicate rollers adapted to be used in cameras, roller 2 being used as the roll containing the unexposed film, while roller 1 is the roll adapted to receive and contain the exposed film. In cameras using rolled films it is customary to expose the film until a proper number of exposures have been made and then roll the remaining film and the covering of paper on the roller 1. Usually the paper is made of sufficient length to thoroughly cover the film whereby the roller 1, together with the film may be removed in the light without causing the film to become light-struck. Usually it is desirable to place the hand in the camera before the back has been completely removed so as to hold the film from unwinding, and thereby protect the same against the entrance of light. According to the present invention this precaution is not necessary as means are provided which will automatically seal or connect the end of the film or the paper backing thereof to the body of the rolled film as soon as all of the film and paper backing has been wound on the roller 1.

Figure 1:
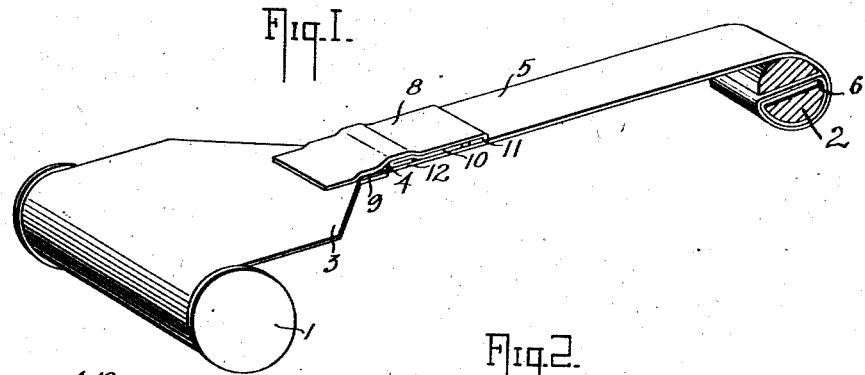
Figure 1 is a perspective view of a pair of rollers, a film, and a sealing device embodying the invention shown in position on the film.
Figure 2:
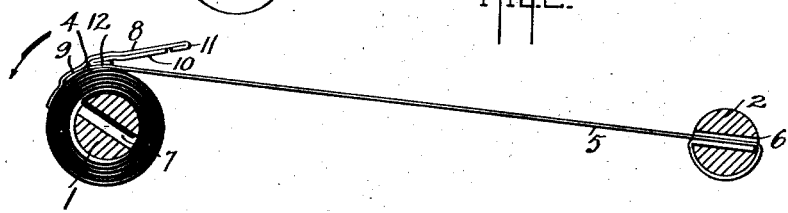
Fig. 2 is a sectional view through two rollers, a rolled film and a sealing device embodying the invention about to be automatically applied.
Figure 3:
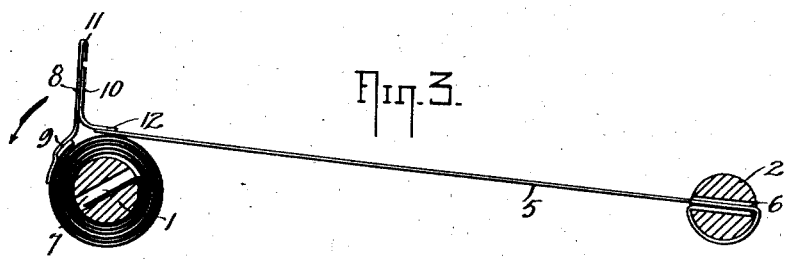
Fig. 3 is a view similar to Fig. 2, but showing the parts in a further advanced position.

As shown in Fig. 1 the film has been wound on roller 1 and most of the paper backing 3. This paper backing is perforated, scored or weakened in some manner at 4. It will be noted also that the paper backing 3 is reduced at 5 and is wrapped around the roller 2 and then threaded through a slot 6. From Fig. 2 it will be observed that the reduced portion 5 extends through the slot once around half of the roller 2 and then into the slot so that after having been inserted in this manner the unexposed film may be rolled thereon preparatory for sale. After the roller 2 with the unexposed film has been placed in the camera, the outer or free end is connected with roller 2 in any desired manner, as for instance by having one end extending into slot 7. As the film is used and is rolled on the roller 1 the parts will assume the position shown in Fig. 2. Any further turning of the roller 1 from the position shown in Fig. 2 will cause the paper backing 3 to break along the weakened line 4 as indicated in Fig. 3.

Figure 4:
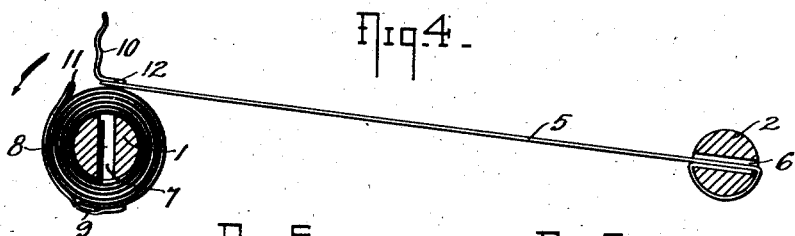
Fig. 4 is a view similar to Fig. 3, but showing the parts in a still further advanced position, and the sealer just applied.
Figure 5:
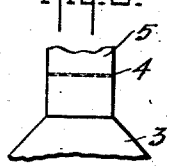
Fig. 5 is a fragmentary top plan view of a paper protecting strip at the point of application of the sealing device.
Figure 6:
Fig. 6 is a fragmentary sectional view through a roller adapted to be used in a camera with a modified form of film locking member.

An adhesive member 8 is glued or otherwise rigidly secured to the paper backing 3 at 9 and is connected to a strip of fabric or any other suitable material 10 by the adhesive matter on the strip 8. This strip and adhesive matter is preferably of the same kind as the ordinary adhesive plaster now in common use in the medical profession. The adhesive qualities of this tape are such that the cloth 10 will adhere thereto under ordinary circumstances, but may be stripped therefrom and yet allow the adhesive to be in good shape to stick to the paper backing 3 when pulled as shown in Figs. 3 and 4. A small bent over end section is provided which will act as a tab in removing the sealing strip 8 after it has been sealed down as shown in Fig. 4. The cloth strip 10 is secured to the reduced section 5 of the paper backing at 12 by glue or other strong adhesive so that when the roller 1 is being rotated and is moved from the position shown in Fig. 2 to the position shown in Fig. 3 the strain will cause the paper 5 to break at line 4, but will not disconnect the paper or section 5 from the strip 10, but will begin to remove said strip from the sealing strip 8. As the roller 1 continues to rotate the face of strip 8 provided with adhesive will be brought forcibly into contact with part of the paper backing 3 and will be pressed against the same as the strip 10 is removed so that upon the completion of the removal of strip 10 the parts will be substantially as shown in Fig. 4. After the film has been rolled on the roller 1 and sealed in this manner the camera may be opened and the roller removed without any danger of the film being light-struck. Instead of winding the end of the strip 5 through the aperture 6 it could be merely looped therethrough as shown in Fig. 6 and a retaining pin 13 inserted.

I claim:

1. A sealing device for rolled films comprising a sealing strip adapted to be connected to the protecting paper strip of the film, and means for automatically causing the same to adhere to said strip when fully rolled on the exposed film roller.

2. A sealing device for rolled films comprising a sealing strip having adhesive on one face, and a paper pull strip connected therewith for causing the adhesive face to be pressed against the rolled film as it completes its winding action.

3. In a device of the character described, the combination with a film and paper protecting strip therefor, of an extension projecting on the end of said strip, said extension being perforated adjacent the strip, a sealing member having adhesive on one face connected with one strip and overlapping said extension, and means firmly secured to said extension and connected with said strip by the adhesive thereon whereby when said film and protecting strip of paper has been wound fully said extension will be torn from said strip of paper and the protecting strip connected thereto will be gradually stripped from the sealing strip, and the stripping action will cause the sealing strip to be pressed against the rolled film with the adhesive face engaging said rolled film.

4. A sealing device comprising a strip having adhesive on one face, means for rigidly securing one end of said strip to the protecting paper of a film, a protecting applying strip engaging the adhesive face of said strip at its free end, means forming an extension of the said paper protecting strip for automatically removing the applying strip, and at the same time pressing the sealing strip against the film when in a rolled condition.

5. A device of the character described comprising a sealing strip adapted to be connected to the protecting paper strip of a photographic film, an applying strip temporarily connected with said sealing strip on the face containing the adhesive, and an extension removably connected with the film protecting strip rigidly connected to said applying strip so that as the film is wound the extension will be disconnected therefrom and will pull the applying strip from the sealing strip and at the same time press the sealing strip against the rolled film.

VICTOR ST. CLAIR BLACKETT.